May 26, 1936.  O. HEUMADER  2,041,927
POWER TRANSMISSION MECHANISM
Filed Aug. 27, 1934  4 Sheets-Sheet 1
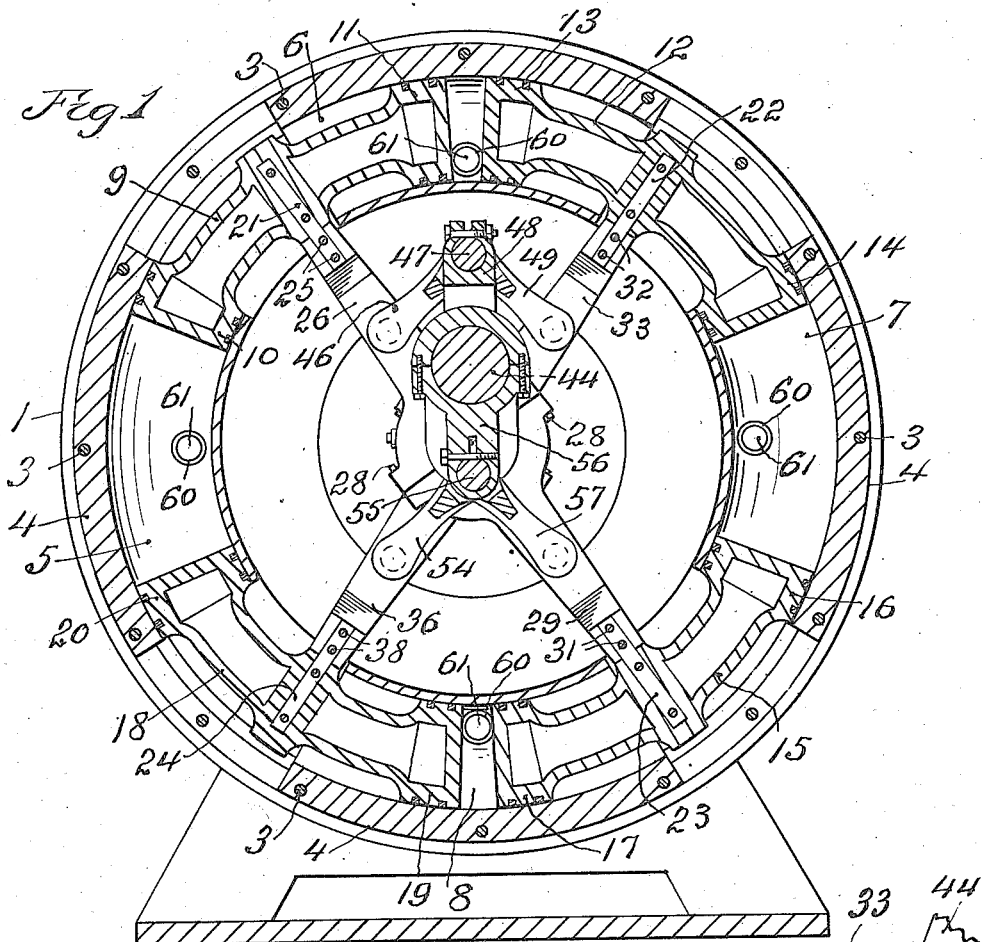
INVENTOR
Otto Heumader
BY Warren D. House
His ATTORNEY May 26, 1936.  O. HEUMADER  2,041,927
POWER TRANSMISSION MECHANISM
Filed Aug. 27, 1934    4 Sheets-Sheet 2
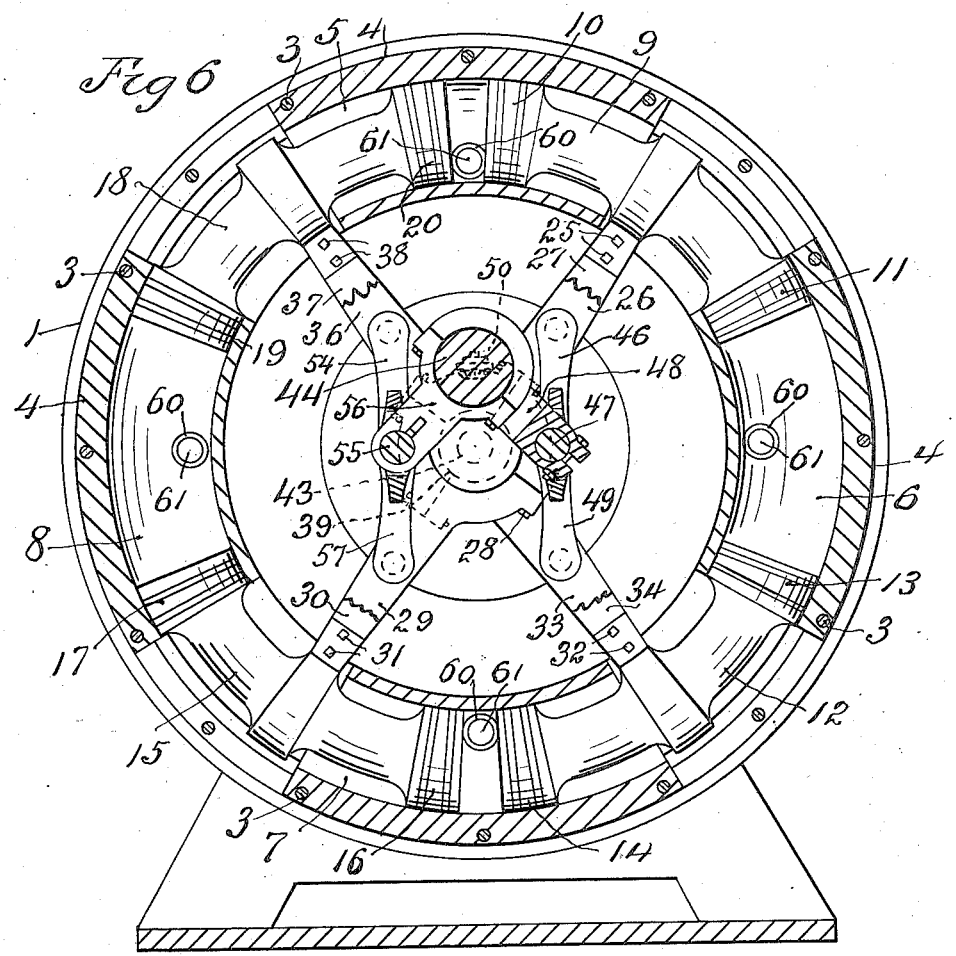
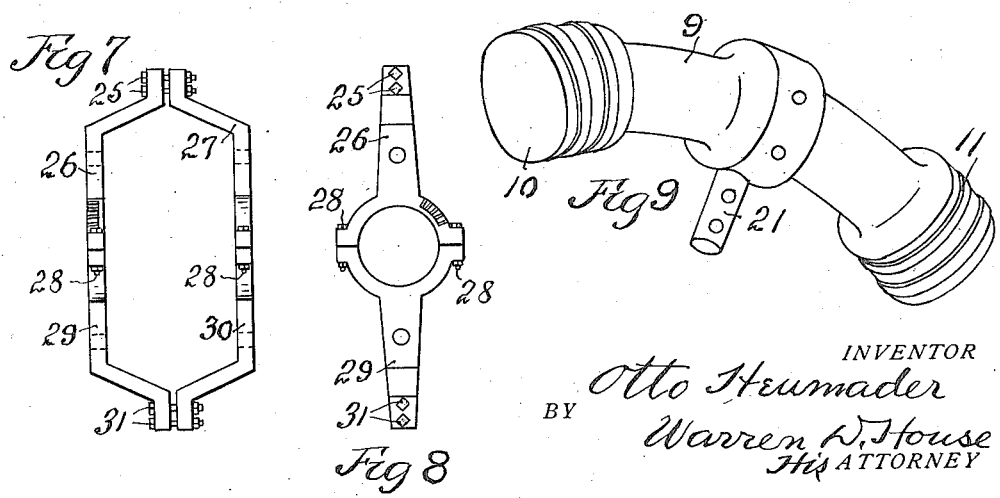
INVENTOR
Otto Heumader
BY Warren W. House
His ATTORNEY May 26, 1936.  O. HEUMADER  2,041,927
POWER TRANSMISSION MECHANISM
Filed Aug. 27, 1934   4 Sheets-Sheet 3
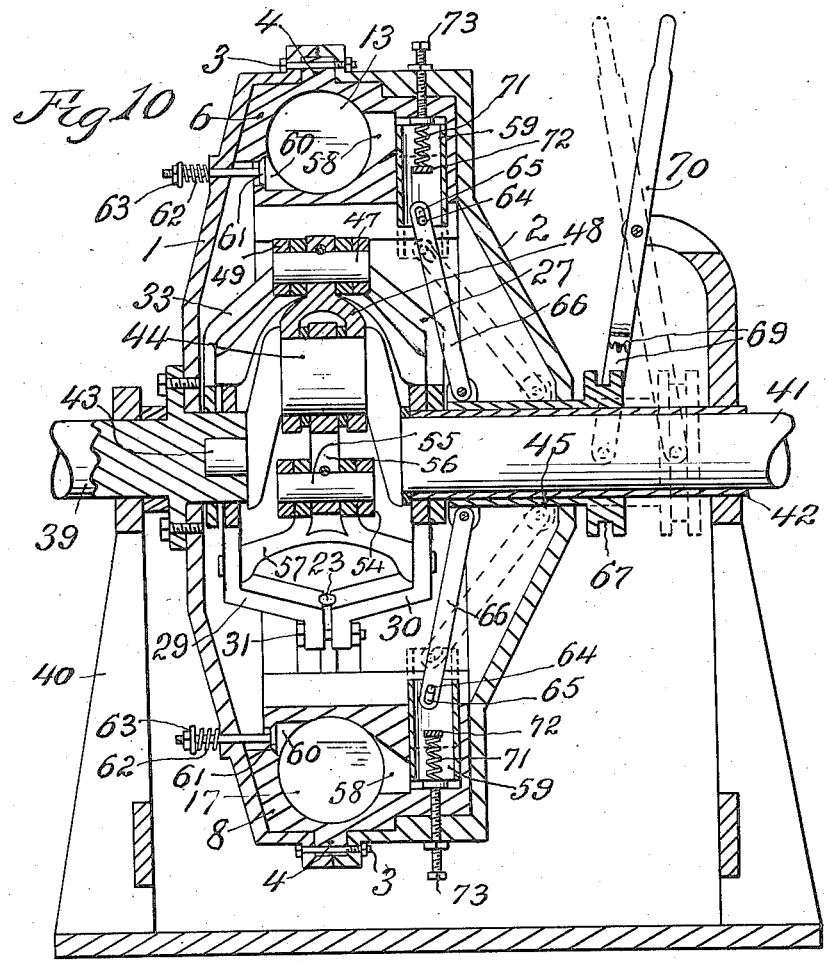
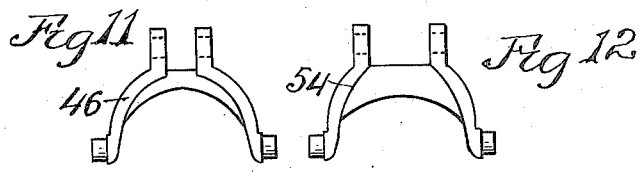
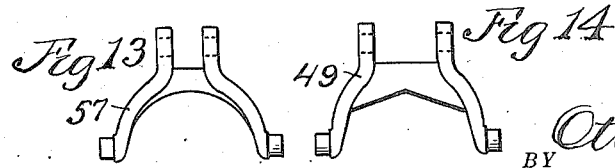
INVENTOR
Otto Heumader
BY Warren D. House
His ATTORNEY

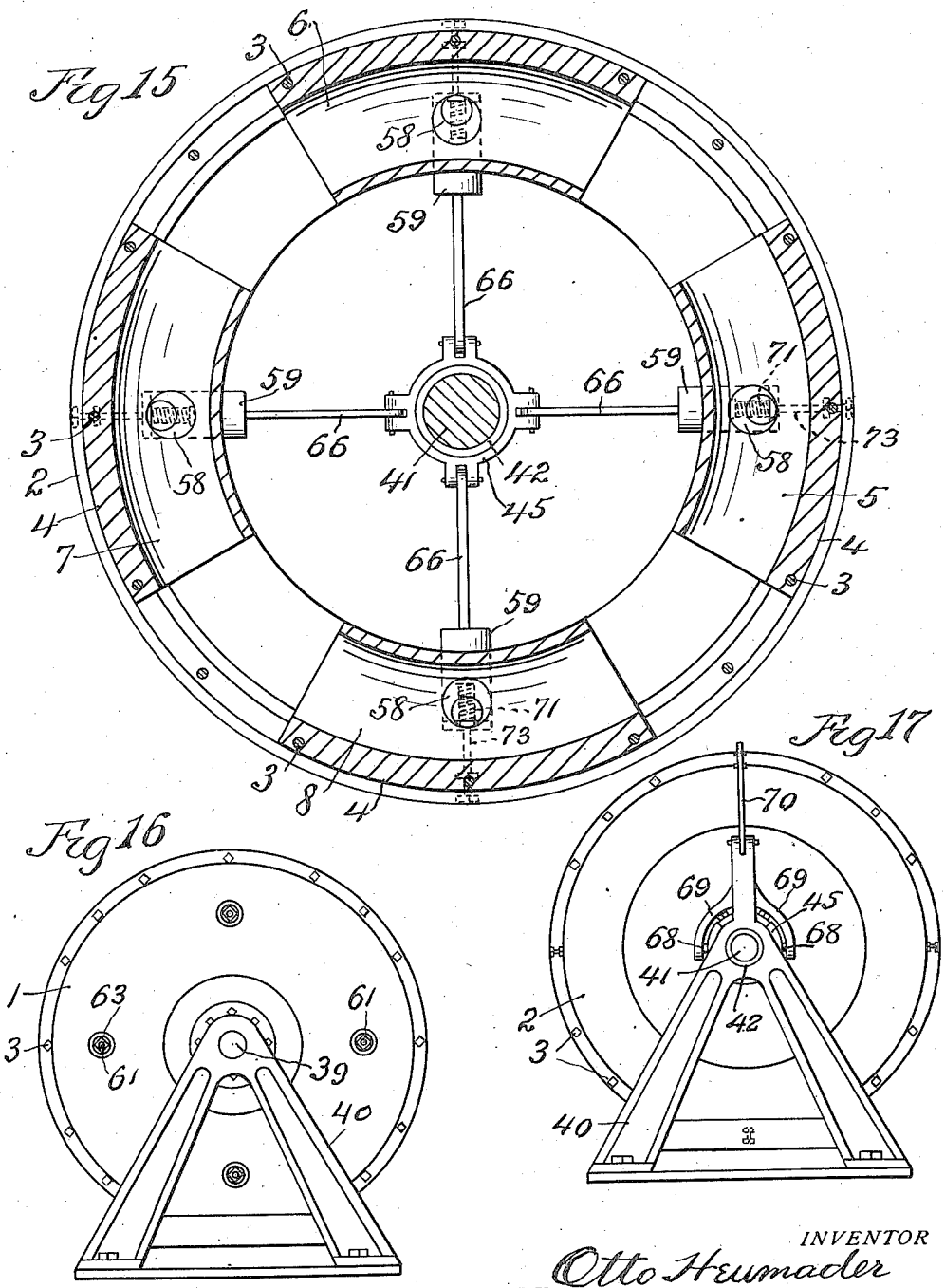

Patented May 26, 1936

2,041,927

UNITED STATES PATENT OFFICE 2,041,927

POWER TRANSMISSION MECHANISM

Otto Heumader, St. Joseph, Mo.

Application August 27, 1934, Serial No. 741,553

16 Claims. (Cl. 192—58)

My invention relates to improvements in power transmission mechanisms. It is adapted for use as a clutch, and as a substitute for change speed gearing in an automobile. It is particularly adapted for the use of oil or other liquid as a power transmitting medium.

One of the objects of my invention is to provide a power transmission mechanism of the kind described which is simple, relatively cheap to construct, which is strong, durable, not likely to get out of order, which will transmit power at any speed up to the maximum speed of the driving power, which is efficient in its operation, and in which at maximum speed there is no relative movement between the driving and the driven members.

The novel features of my invention are hereinafter fully described and claimed.

In the accompanying drawings, which illustrate the preferred embodiment of my invention, Fig. 1 is a central vertical cross sectional view of my improved transmission mechanism.

Fig. 2 is a side elevation, reduced, of one pair of piston yokes.

Fig. 3 is an end elevation of the piston yokes shown in Fig. 2.

Fig. 4 is an enlarged fragmental view, partly in elevation and partly in section of the bevel gearing and parts connected therewith by which simultaneous reciprocation in opposite directions of the two pairs of pistons is effected.

Fig. 5 is a further enlarged fragmental view of the parts shown in Fig. 4.

Fig. 6 is a view similar to Fig. 1, showing the casing as having revolved a quarter of a revolution, while the crank member has remained idle and stationary, and the pistons have made each a stroke or half a reciprocation. The pistons are shown in elevation, as are their attached yokes, the latter being partly broken away.

Fig. 7 is a view similar to Fig. 2, showing the other pair of piston yokes.

Fig. 8 is an end elevation of the yokes shown in Fig. 7.

Fig. 9 is an enlarged perspective view of a portion of one of the pistons.

Fig. 10 is an enlarged vertical, longitudinal, sectional view of what is shown in Fig. 1, some parts being omitted, and some shown in elevation.

Figs. 11, 12, 13, and 14 are respectively plan views of four of the links which connect the piston yokes with the crank shaft.

Fig. 15 is a central vertical cross sectional view of the revoluble casing, showing also a portion of the crank shaft and a part of the controlling valve mechanism, other parts being omitted.

Fig. 16 is a reduced end elevation of my improved mechanism.

Fig. 17 is a view similar to Fig. 16, looking at the other end of the mechanism.

Similar characters of reference designate similar parts in the different views.

In the form shown, my improved transmission mechanism provides a circular casing, which, in operative condition, is filled or substantially filled with a liquid, preferably lubricating oil.

The casing, as shown, comprises two circular end members 1 and 2 clamped together by bolts 3 which also extend through peripheral flanges 4 of four arcuate concentric cylinders 5, 6, 7, and 8 circumferentially alined and equally spaced apart, Figs. 1, 6, 10, and 15.

A piston 9 is provided at opposite ends with heads 10 and 11 which are respectively reciprocative in the cylinders 5 and 6.

A piston 12 has two heads 13 and 14 respectively reciprocative in the cylinders 6 and 7.

A piston 15 has two heads 16 and 17 respectively reciprocative in the cylinders 7 and 8.

A piston 18 has two heads 19 and 20 respectively reciprocative in the cylinders 8 and 5.

Each of the pistons 9, 12, 15, and 18 is provided intermediate of its heads with a radial arm, which extends inwardly toward the axis of the casing members 1 and 2, said arms being designated respectively by 21, 22, 23, and 24, Figs. 1, 9, and 10.

The arm 21 of the piston 9 is held clamped by bolts 25 between two yoke members 26 and 27, which are respectively clamped by bolts 28 to two yoke members 29 and 30, which are clamped by bolts 31 to the arm 23 of the piston 15, Figs. 1, 6, 7, 8, and 10.

The arm 22 of the piston 12 is clamped by bolts 32 between two yoke members 33 and 34, which are respectively clamped by bolts 35 to two yoke members 36 and 37, which are clamped by bolts 38 to the arm 24 of the piston 18, Figs. 1, 2, 3, and 6.

Concentrically fastened to and revoluble with the casing member 1 is a rotary member 39 revolubly supported in any suitable manner, as in the left arm, as viewed in Fig. 10, of a bracket or stand 40, which may be a portion of an automobile or other engine frame.

Axially alined with the rotary member or shaft 39 is another rotary member or shaft 41, which is revoluble in a tubular bearing member 42 mounted in the right arm, as viewed in Fig. 1, of the bracket 40. The rotary member 41 has a reduced end portion 43 revolubly fitted in the adjacent end of the rotary member 39, Fig. 10. The rotary member 41 is provided with a crank 44.

Longitudinally slidable and revoluble on the tubular bearing member 42 is a sleeve 45 which extends through and upon which the casing member 2 is revoluble.

The members 26 and 29 and the members 27 and 30 form a pair of yokes which are respectively pivoted upon the rotary member 39 and the tubular bearing member 42. These yokes, being rigidly clamped to each other and to the arms 21 and 23 respectively serve as a piston rod jointly for and form in effect integral parts of the pistons 9 and 15 and control the oscillations of the latter, as will be hereinafter explained.

The members 33 and 36 and the members 34 and 37 form a pair of yokes which are respectively pivoted upon the rotary member 39 and the tubular bearing member 42. These yokes, being rigidly clamped to each other and to the arms 22 and 24 respectively serve as a piston rod jointly for and form in effect integral parts of the pistons 12 and 18 and control the oscillations of the latter.

For effecting driving connection between the pistons 9, 12, 15, and 18 and the crank 44, means is provided connecting the pistons with the crank which causes the pistons, each to reciprocate when either member 39 or 41 is revolved and the other member is idle and liquid in the casing is free to enter the cylinders 5, 6, 7, and 8 from the interior of the casing and to pass from the cylinders into the casing, and which effects rotation of one of said members when the other member is revolved and the liquid is held from discharge from the cylinders. In the embodiment shown, such driving means comprises a bow shaped link 46 pivoted at its ends respectively to the yoke members 26 and 27, and pivoted centrally to a pin 47 mounted in a link 48, which is pivoted to the crank 44, and a bow shaped link 49 pivoted at its ends respectively to the yoke members 33 and 34, and centrally pivoted to the pin 47.

The pivotal connections between the links 46, 48, and 49 are such that when the pistons are free to reciprocate in the cylinders and the casing is revolved and the crank 44 is idle, the link 48 can revolve freely around the crank 44 without turning the latter.

Or, under the same conditions, if the crank 44 is revolved and the casing is stationary and the liquid can freely enter and pass from the cylinders, the pistons will simultaneously reciprocate in opposite directions.

However, if the liquid is held from entering and passing from the cylinders, the revolution of either member 39 or 41 will effect rotation of the other member.

In order to effect proper oscillation or reciprocation at the same speed of the pistons in the cylinders, with respect to each other and to the casing, there is revoluble on a radial pin 50, Figs. 4 and 5, and Figs. 1 and 6, a bevel gear wheel 51 which meshes with arcuate rows 52 and 53 respectively concentrically provided on the yoke members 33 and 26. When one of said yoke members, as the member 33 turns in one direction, the gear wheel 51 will cause the other yoke member 26 to turn simultaneously in the opposite direction and at the same speed. The radial pin 50 is mounted in the rotary member or shaft 39, so that the pistons oscillate not alone with respect to each other in a proper manner, but are retained in proper reciprocative relationship to the cylinders and casing.

For retaining a proper balance, due to the employment of the links 46, 48, and 49 and pin 47, there may be provided, as shown, a link 54 the ends of which are respectively pivoted to the yoke members 36 and 37 and centrally pivoted to a pin 55 mounted in a link 56 also pivoted to the crank 44, and a link 57 centrally pivoted to the pin 55 and respectively pivoted at its ends to the yoke members 29 and 30. The links 54, 56, and 57 are pivotally connected to the crank 44 and yoke members in a manner corresponding to the pivotal connections of the links 46, 48, and 49, and in a similar manner effect the same functions.

For conducting liquid into and from the cylinders 5, 6, 7, and 8, there is provided at a point intermediate of the inner stroke of the two pistons in each cylinder a port 58 which connects through a sliding tubular valve 59 with the interior of the casing. When the valve 59 is open and the pistons move on their outer stroke, the liquid, as oil, can pass from the casing through the valve 59 and port 58 into the cylinder. So, with the port 58 open, and the casing revolving, the pistons can oscillate without effecting turning of the crank 44. If, however, the valve 59 is fully closed, no oil can enter or leave the cylinder, and the pistons therein can not reciprocate, or oscillate.

As shown, each cylinder may also be provided with a port 60 which is normally automatically closed by an inwardly opening check valve 61, which has its stem extending outside the casing member 1 and provided outside the casing with a nut against which bears one end of a coiled spring 62, the nut being designated by 63, the other end of the spring bearing against the casing member 1. The spring holds the valve 61 normally closed. When the pistons move outwardly in a cylinder, the valve 61 opens and allows oil to enter the cylinder.

To open the valves 59, they are respectively provided with cross pins 64 extending each through a slot 65 in one end portion of a link 66, Fig. 10, the other end of which is pivoted to the sleeve 45. When the sleeve 45 is moved outwardly, to the position shown in dotted lines in Fig. 10, the valves 59 will be opened, thus permitting oil to enter or pass from the cylinders through the ports 58 and tubular valves 59. For opening and closing the valves 59 through the sliding of the sleeve 45, the latter has an annular groove 67 into which extend two pins 68 on two arms 69 of a manually swung lever 70 pivoted to the right arm of the bracket 40, as viewed in Fig. 10.

The operation of the lever 70 will only close the valves 59 to the position shown in Fig. 10. A coil spring 71 which bears at one end, in each valve 59, against a bridge 72 in the valve, bears at its other end against an adjustable screw 73 which extends outside the casing member 2, so that it can be adjusted from the outside of the casing.

When a certain speed of revolution is obtained by the casing, the tension of the spring 71 is overcome by the centrifugal force of the valve 59, which is disposed to slide radially, thereby closing the port 58, so that no oil can enter or pass from the cylinder through the port 58.

Thus up to a certain speed of revolution, depending upon the tension applied to the spring 71 by the screw 73, oil can enter and pass from the cylinder to a restricted degree, so that the revolution of the driven member, be it the rotary member 39 or 41, will be slower than the speed of the driving member.

In the operation of my invention, assuming the shaft or rotary member 39 to be the driving member, and the lever 70 is in the open position, shown in dotted lines in Fig. 10, the casing in revolving will carry with it the pistons 9, 12, 15, and 18, and the crank 44 being stationary or idle, the pistons will reciprocate through the intermediacy of the links 46, 48, and 49 and the links 54, 56, and 57, and the oil will enter the cylinders 5, 6, 7, and 8 through the ports 58 and 60, and will pass from the cylinders into the casing through the ports 28.

If the lever 70 now be swung to close the valves 59, the casing in revolving will revolve the crank 44, through the action of the pistons 9, 12, 15, and 18 and their link connections, already described, but not so rapidly as the rotation of the casing, until the speed of the latter reaches a predetermined rate upon which the valves 59 will fully close, and reciprocation of the pistons will cease, thus locking the pistons to the crank 44, so as to rotate the latter at the same speed as the casing.

When the valves 59 are fully closed, there will be no relative movement between the two rotary members 39 and 41, the pistons and the link connections between the latter and the crank 44, so that under such conditions the only wear on the mechanisms will be in the shafts 39 and 41 and their bearings.

If rotation is imparted to the shaft 41 as a driving member, and the valves 59 are fully open, the crank 44 will, through the links 48 and 56, and the links 46, 49, 54, and 57, oscillate the pistons 9, 12, 15, and 18 without revolving the casing or attached shaft 39. If the lever 70 is adjusted to partly close the valves 59 and thereby partly close the ports 58, the restriction of flow of the oil into and out of the cylinders 5, 6, 7, and 8, will effect a speed of revolution of the casing and shaft 39, relative to that of the shaft 41, dependent upon the amount of closure of the valves 59 and ports 58. If the valves 59 are fully closed, the pistons will not oscillate, and the casing and shaft 39 will revolve at the same speed as the shaft 41.

The check valves 61 and ports 60 could be eliminated, if desired, and the cylinders supplied with fluid and exhausted through the ports 58 alone.

While it is preferable to employ as a transmission medium a substantially non-compressible fluid, as oil or water, a compressible fluid, such as air or gas, could be employed as the transmission medium, but it would have less efficiency than the liquid medium.

I do not limit my invention to the structure herein shown and described, as many modifications, within the scope of the appended claims, may be made without departing from the spirit of my invention.

What I claim is:

1. In a power transmission mechanism, a revoluble liquid containing casing having an arcuate cylinder concentric with the axis of said casing and provided with a port communicating with the interior of the casing, a valve for closing said port, two rotary members one attached to and revoluble with said casing, a piston reciprocative in said cylinder, and means connected with said piston and the other rotary member which causes the piston to reciprocate when one of said members is revolved and the other member is idle and said valve is open, and which effects rotation of one of said members when the other member is revolved and said valve is closed and the piston is held by liquid in said cylinder from reciprocating.

2. In a power transmission mechanism, a revoluble liquid containing casing having a concentric arcuate cylinder provided with a port communicating with the interior of said casing, a valve for closing said port, two axially alined rotary members one attached to and revoluble with said casing, the other member having a crank, a piston reciprocative in said cylinder, and means connected with said piston and said crank which causes the piston to reciprocate when one of said members is revolved and the other member is idle and said valve is open, and which effects rotation of one member when the other member is revolved and said valve is closed and the piston is held by liquid in said cylinder from reciprocating.

3. In a power transmission mechanism, a liquid containing revoluble casing having two arcuate cylinders concentric with said casing, each cylinder having a port communicating with the interior of said casing, controlling means for closing said two ports, two axially alined rotary members one attached to and revoluble with said casing, the other having a crank, a piston reciprocative in said cylinders, and means connected with said piston and said crank which causes the piston to reciprocate when one of said members is revolved and the other member is idle and said two ports are open, and which effects rotation of one of said members when the other member is revolved and said two ports are closed and the piston is held by liquid in said cylinders from reciprocating.

4. In a power transmission mechanism, a revoluble liquid containing casing having two pairs of cylinders, each cylinder having a port communicating with the interior of said casing, controlling means for closing said ports, two axially alined rotary members one attached to and revoluble with said casing, the other member having a crank, two pistons fastened together and pivoted on the axis of and in said casing, one piston being reciprocative in one of said pair of cylinders and the other piston being reciprocative in the other pair of cylinders, and means connected with one of said pistons and said crank which causes said pistons to reciprocate when one of said members is revolved and the other member is idle and said ports are open, and which effects rotation of one of said members when the other member is revolved and said ports are closed, and the pistons are held by liquid in the cylinders from reciprocating.

5. In a power transmission mechanism, a revoluble liquid containing casing having two pairs of cylinders, each having a port communicating with the interior of said casing, controlling means for closing said ports, two rotary members one attached to and revoluble with said casing, two pistons, one reciprocative in one of said pairs of cylinders and the other reciprocative in the other pair of cylinders, and means, including two links pivoted to each other and respectively pivoted to one of said pistons and to the other of said rotary members, which causes said pistons to reciprocate when one of said members is revolved and the other member is idle and said ports are open, and which effects rotation of one of said members when the other member is revolved and said ports are closed, and said pistons thereby held by liquid in said cylinders from reciprocating.

6. In a power transmission mechanism, a revoluble liquid containing casing having two cylinders each having a port communicating with the interior of said casing, two valves for closing said ports respectively, two rotary members one attached to and revoluble with said casing, the other member having a crank, two pistons respectively reciprocative in said cylinders, means, including a link pivoted to said crank and two links pivoted to said link and to each other and respectively pivoted to said pistons, which causes said pistons to reciprocate when one of said members is revolved and the other member is idle and said valves are open, and which effects rotation of one of said members when the other member is revolved and said valves are closed and said pistons thereby held by liquid in said cylinders from reciprocating, and means by which said pistons are made to simultaneously reciprocate in opposite directions.

7. In a power transmission mechanism, a revoluble liquid containing casing having an arcuate cylinder concentric with the axis of said casing and liquid conducting means for conducting liquid from the casing into said cylinder and from said cylinder into said casing, controlling means by which liquid may be prevented from passing from said cylinder into said casing, two rotary members one attached to and revoluble with said casing, a piston reciprocative in said cylinder, and driving means connecting said piston with the other rotary member which causes said piston to reciprocate when one of said members is revolved and the other member is idle, and said controlling means permits discharge of liquid from said cylinder into said casing, and which effects rotation of one of said members when the other member is revolved and said controlling means prevents discharge of liquid from said cylinder, and the piston is thereby held from reciprocating.

8. In a power transmission mechanism, a revoluble liquid containing casing having an arcuate cylinder concentric with the axis of said casing and liquid conducting means connecting said cylinder with the interior of said casing, controlling means by which liquid may be prevented from passing through said conducting means, two rotary members one attached to and revoluble with said casing, two pistons reciprocative in said cylinder at opposite sides respectively of said conducting means, and driving means connecting said pistons with the other rotary member which causes said pistons to reciprocate when one of said members is revolved and the other member is idle, and said controlling means permits discharge of liquid through said conducting means, and which effects rotation of one of said members when the other member is revolved and said controlling means prevents liquid passing through said conducting means, and the pistons are thereby held from reciprocating.

9. In a power transmission mechanism, a revoluble liquid containing casing having an arcuate cylinder concentric with the axis of said casing and liquid conducting means connecting said cylinder with the interior of said casing, controlling means by which liquid may be prevented from passing through said conducting means, two rotary members one attached to and revoluble with said casing, two pistons reciprocative in said cylinder, driving means connecting said pistons with the other rotary member which causes said pistons to reciprocate when one of said members is revolved and the other member is idle, and said controlling means permits liquid to pass through said conducting means, and which effects rotation of one of said members when the other member is revolved and said controlling means prevents liquid passing through said conducting means, and the pistons are thereby held from reciprocating, and means by which said pistons are made to reciprocate simultaneously in opposite directions.

10. In a power transmission mechanism, a revoluble liquid containing casing having an arcuate cylinder concentric with the axis of said casing and liquid conducting means connecting said cylinder with the interior of said casing, controlling means by which liquid may be prevented from passing through said conducting means, two rotary members one attached to and revoluble with said casing, two pistons reciprocative in said cylinder, and driving means connecting said pistons with the other rotary member which causes said pistons to reciprocate when one of said members is revolved and the other member is idle, and said controlling means permits liquid to pass through said conducting means, and which effects rotation of one of said members when the other member is revolved and said controlling means prevents liquid passing through said conducting means, and the pistons are thereby held from reciprocating.

11. In a power transmission mechanism, a revoluble liquid containing casing having an arcuate concentric cylinder and liquid conducting means connecting said cylinder with the interior of said casing, controlling means by which liquid may be prevented from passing through said conducting means, two rotary members one attached to and revoluble with said casing, the other having a crank, a piston reciprocative in said cylinder, and means, including two links pivoted to each other and respectively pivoted to said piston and to said crank, which causes said piston to reciprocate when one of said members is revolved and the other member is idle, and said controlling means permits liquid to pass through said conducting means, and which effects rotation of one of said members when the other member is revolved, and said controlling means prevents liquid passing through said conducting means, and the piston is thereby held from reciprocating.

12. In a power transmission mechanism, a revoluble liquid containing casing having an arcuate concentric cylinder and liquid conducting means connecting said cylinder with the interior of said casing, controlling means by which liquid may be prevented from passing through said conducting means, two axially alined rotary members one attached to and revoluble with said casing, the other member having a crank, two pistons reciprocative in said cylinder, and means, including a link pivoted to said crank and two links pivoted to said link and to each other and respectively pivoted to said pistons, which causes said pistons to reciprocate when one of said members is revolved and the other member is idle, and said controlling means permits liquid to pass through said conducting means, and which effects rotation of one of said members when the other member is revolved, and said controlling means prevents liquid passing through said conducting means, and said pistons are thereby held from reciprocating.

13. In a power transmission mechanism, a revoluble liquid containing casing having an arcuate concentric cylinder and liquid conducting means connecting said cylinder with the interior of said casing, controlling means by which liquid may be prevented from passing through said conducting means, two axially alined rotary members one attached to and revoluble with said casing, the other member having a crank, two pistons reciprocative in said cylinder, means, including a link pivoted to said crank and two links pivoted to said link and to each other and respectively pivoted to said pistons, which causes said pistons to reciprocate when one of said members is revolved and the other member is idle, and said controlling means permits liquid to pass through said conducting means, and which effects rotation of one of said members when the other member is revolved, and said controlling means prevents liquid passing through said conducting means, and means by which said pistons are made to simultaneously reciprocate at the same speed in opposite directions.

14. In a power transmission mechanism, a revoluble liquid containing casing, two rotary members one attached to and revoluble with said casing, the other member having a crank, two pistons oscillative on the axis of said casing, means connecting said pistons with said crank which causes said pistons to reciprocate when one of said members is revolved and the other member is idle, and means connecting said pistons by which they are made to reciprocate simultaneously in opposite directions.

15. In a power transmission mechanism, a revoluble liquid containing casing, two axially alined rotary members one attached to and revoluble with said casing, the other having a crank, two pistons oscillative on the axis of said members, means connecting said pistons with said crank which causes said pistons to reciprocate when one of said members is revolved and the other member is idle, and means carried by and revoluble with said member which is attached to said casing by which said pistons are made to simultaneously reciprocate at the same speed in opposite directions.

16. In a power transmission mechanism, a revoluble liquid containing casing having an arcuate cylinder concentric with the axis of said casing and having two ports communicating with the interior of said casing, an inwardly opening check valve for normally closing one of said ports, a manually controlled valve for closing the other of said ports, two rotary members one attached to and revoluble with said casing, a piston reciprocative in said cylinder, and means connected with said piston and the other rotary member which causes the piston to reciprocate when one of said members is revolved and the other member is idle and one of said valves is open, and which effects rotation of one of said members when the other member is revolved and said valves are closed and the piston is held by liquid in said cylinder from reciprocating.

OTTO HEUMADER.